US008386685B2

United States Patent
Powell et al.

(10) Patent No.: US 8,386,685 B2
(45) Date of Patent: *Feb. 26, 2013

(54) APPARATUS AND METHOD FOR PACKET BASED STORAGE VIRTUALIZATION

(75) Inventors: Joseph S. Powell, Costa Mesa, CA (US); Randall Brown, San Diego, CA (US); Stephen G. Finch, Coto De Caza, CA (US)

(73) Assignee: Glace Applications NY LLC, Dover, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 13/275,181

(22) Filed: Oct. 17, 2011
(Under 37 CFR 1.47)

(65) Prior Publication Data

US 2012/0036281 A1 Feb. 9, 2012

Related U.S. Application Data

(60) Continuation of application No. 11/866,971, filed on Oct. 3, 2007, now Pat. No. 8,069,292, which is a division of application No. 10/832,740, filed on Apr. 26, 2004, now Pat. No. 7,302,500.

(60) Provisional application No. 60/467,280, filed on Apr. 30, 2003.

(51) Int. Cl.
*G06F 13/00* (2006.01)
*G06F 3/00* (2006.01)
*G06F 5/00* (2006.01)
*G06F 12/00* (2006.01)
*G06F 9/26* (2006.01)
*G06F 9/34* (2006.01)

(52) U.S. Cl. ............... 710/300; 710/5; 710/6; 710/7; 710/8; 710/20; 710/58; 710/104; 710/15; 710/29; 710/21; 710/33; 710/34; 711/203

(58) Field of Classification Search ............ 710/5–8, 710/15, 20–21, 29, 33–34, 58, 104, 300; 711/203
See application file for complete search history.

(56) References Cited

U.S. PATENT DOCUMENTS

| | | | | |
|---|---|---|---|---|
| 4,841,526 | A * | 6/1989 | Wilson et al. | 714/748 |
| 5,649,102 | A * | 7/1997 | Yamauchi et al. | 709/213 |
| 5,841,659 | A * | 11/1998 | Tanaka et al. | 700/121 |
| 5,941,972 | A | 8/1999 | Hoese et al. | |
| 6,145,028 | A * | 11/2000 | Shank et al. | 710/31 |
| 6,425,035 | B2 | 7/2002 | Hoese et al. | |
| 6,493,811 | B1 | 12/2002 | Blades et al. | |
| 6,883,083 | B1 | 4/2005 | Kemkar | |
| 6,895,483 | B2 * | 5/2005 | Eguchi et al. | 711/165 |
| 7,185,062 | B2 | 2/2007 | Lolayekar et al. | |
| 7,302,500 | B2 | 11/2007 | Powell et al. | |
| 7,555,586 | B2 | 6/2009 | Powell et al. | |
| 7,558,885 | B2 | 7/2009 | Powell et al. | |

(Continued)

OTHER PUBLICATIONS

Farley, Marc, "Building Storage Networks," year 2000, p. 416, Osborne/McGraw Hill.

(Continued)

*Primary Examiner* — Chun-Kuan Lee
*Assistant Examiner* — Farley Abad

(57) ABSTRACT

The present invention provides a method and apparatus for data processing and virtualization. The method and apparatus are configured to receive communications, separate a command communication from a data communication, parallel process the command communication and the data communication, generate at least one virtual command based on the command communication, and generate virtual data according to the at least one virtual command. The apparatus can comprise a parallel virtualization subsystem configured to separate data communications from command communications and to parallel process the command communications and the data communications, to generate virtual commands and to generate virtual data according to a virtual command, and a physical volume driver coupled with the parallel virtualization subsystem, wherein the physical volume driver receives the virtual data and configures the virtual data.

18 Claims, 6 Drawing Sheets

U.S. PATENT DOCUMENTS

| | | | |
|---|---|---|---|
| 8,069,292 B2 | 11/2011 | Powell et al. | |
| 2002/0010813 A1 | 1/2002 | Hoese et al. | |
| 2003/0079018 A1* | 4/2003 | Lolayekar et al. | 709/226 |
| 2003/0093567 A1 | 5/2003 | Lolayekar et al. | |
| 2003/0149848 A1 | 8/2003 | Ibrahim et al. | |
| 2003/0165161 A1 | 9/2003 | Kalliokulju et al. | |
| 2003/0229690 A1* | 12/2003 | Kitani et al. | 709/223 |
| 2004/0103261 A1 | 5/2004 | Honda et al. | |
| 2005/0005033 A1 | 1/2005 | Powell et al. | |
| 2005/0176430 A1 | 8/2005 | Lee et al. | |
| 2007/0192554 A1 | 8/2007 | Higaki et al. | |
| 2008/0028106 A1 | 1/2008 | Powell et al. | |
| 2008/0034125 A1 | 2/2008 | Powell et al. | |

OTHER PUBLICATIONS

Rigney, C. et al., "Remote Authentication Dial in User Service (RADIUS)," Network Working Group, Request for Comments: 2058, Jan. 1997, pp. 1-64.

U.S. Appl. No. 11/866,963, filed Oct. 3, 2007, Powell et al.

US. Appl. No. 11/866,968, filed Oct. 3, 2007, Powell et al. [86575].

USPTO; Notice of Allowance and Fee(s) Due issued in U.S. Appl. No. 11/866,963; mailed Mar. 9, 2009; 4 pages.

USPTO; Notice of Allowance and Fee(s) Due issued in U.S. Appl. No. 11/866,968; mailed Mar. 10, 2009; 4 pages.

USPTO; Notice of Allowance mailed Aug. 21, 2007 in U.S. Appl. No. 10/832,740, now U.S. Patent No. 7,302,500, 6 pages.

USPTO; Office Action issued in U.S. Appl. No. 11/866,963; mailed Sep. 11, 2008; 7 pp.

USPTO; Office Action issued in U.S. Appl. No. 11/866,968; mailed Sep. 11, 2008; 7 pages.

USPTO; Office Action mailed Apr. 17, 2007 in U.S. Appl. No. 10/832,740, now U.S. Patent No. 7,302,500, 10 pages.

USPTO; Supplemental Notice of Allowability issued in U.S. Appl. No. 11/866,963; mailed Jun. 4, 2009; 2 pages.

USPTO; Supplemental Notice of Allowability issued in U.S. Appl. No. 11/866,968; mailed Jun. 8, 2009; 2 pages.

USPTO, Notice of Allowance issued in U.S. Appl. No. 11/866,971 mailed Jul. 21, 2011, 9 pages.

USPTO, Office Action issued in U.S. Appl. No. 11/866,971 mailed Mar. 21, 2011, 17 pages.

USPTO, Office Action issued in U.S. Appl. No. 11/866,971 mailed Dec. 7, 2010, 13 pages.

USPTO, Office Action issued in U.S. Appl. No. 11/866,971 mailed Apr. 27, 2010, 9 pages.

* cited by examiner

APPARATUS AND METHOD FOR PACKET BASED STORAGE VIRTUALIZATION

CROSS-REFERENCE TO RELATED APPLICATIONS

This application is a continuation of U.S. patent application Ser. No. 11/866,971, filed Oct. 3, 2007, entitled "APPARATUS AND METHOD FOR PACKET BASED STORAGE VIRTUALIZATION," which is a divisional of U.S. patent application Ser. No. 10/832,740, filed Apr. 26, 2004, entitled "APPARATUS AND METHOD FOR PACKET BASED STORAGE VIRTUALIZATION," now U.S. Pat. No. 7,302,500, which claims the benefit of U.S. Provisional Patent Application No. 60/467,280, filed Apr. 30, 2003, entitled "APPARATUS AND METHOD FOR PACKET BASED STORAGE VIRTUALIZATION," the entire disclosures of which are all hereby fully incorporated by reference herein in their entireties.

BACKGROUND OF THE INVENTION

1. Field of the Invention

The present invention relates generally to data processing and virtualization, and more specifically to data virtualization through parallel processing.

2. Discussion of the Related Art

Previous systems provide data virtualization. For example, some redundant array of independent disks (RAID) utilized for data storage virtualize data by distributing the data over a plurality of disks of a storage device. Typically when previous systems virtualize data they process and virtualize the data in large input-output blocks (I/O) of data based on the protocol in which the system is operating. These previous devices wait for an entire I/O to be received, and then they begin the processing and virtualization. Once an I/O is virtualized, the entire virtual I/O is communicated out to the storage disks.

Further, some previous devices attempt to improve performance by reducing the number of data transfers that take place. These previous systems accumulate a plurality of I/Os before virtualizing and then transfer the entire accumulated blocks of I/O data all at once.

It is with respect to these and other background information factors relevant to the field of optical communications that the present invention has evolved.

SUMMARY OF THE INVENTION

The present invention advantageously addresses the needs above as well as other needs by providing a method, apparatus, system and network for data virtualization. The method can comprise the steps of receiving communications, separating a command communication from a data communication, parallel processing the command communication and the data communication, generating at least one command based on the command communication, and generating virtual data according to the at least one command.

In another embodiment, the invention provides a method for data virtualization that can comprise the steps of receiving communications, determining if the communications include a command communication, forwarding the command communication for command processing, generating a command, determining if the communications includes at least a portion of a data communication, forwarding the at least a portion of the data communication for data processing, and generating virtualized data based on the at least the portion of the data communication according to the command prior to receiving all data associated with the data communication.

In one embodiment, the present invention provides an apparatus for virtualizing data that can comprise a logic unit configured to receive communications and to separate command communications from data communications, a command unit coupled with the logic unit, wherein the command unit is configured to receive the command communications and to generate one or more virtual commands based on at least one command communication, and a data engine coupled with both the logic unit and the command unit, wherein the data engine is configured to receive the at least one virtual command, to receive the data communications and to generate virtual data as dictated according to the at least one virtual command.

In another embodiment, the invention provides an apparatus for data virtualization than can comprise a first parallel virtualization subsystem configured to separate first data communications from first command communications and to parallel process the first command communications and the first data communications, to generate at least one first virtual command and to generate first virtual data according to the at least one first virtual command, and a first physical volume driver coupled with the first parallel virtualization subsystem, wherein the first physical volume driver receives the first virtual data and configures the first virtual data.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION

Figure 1:
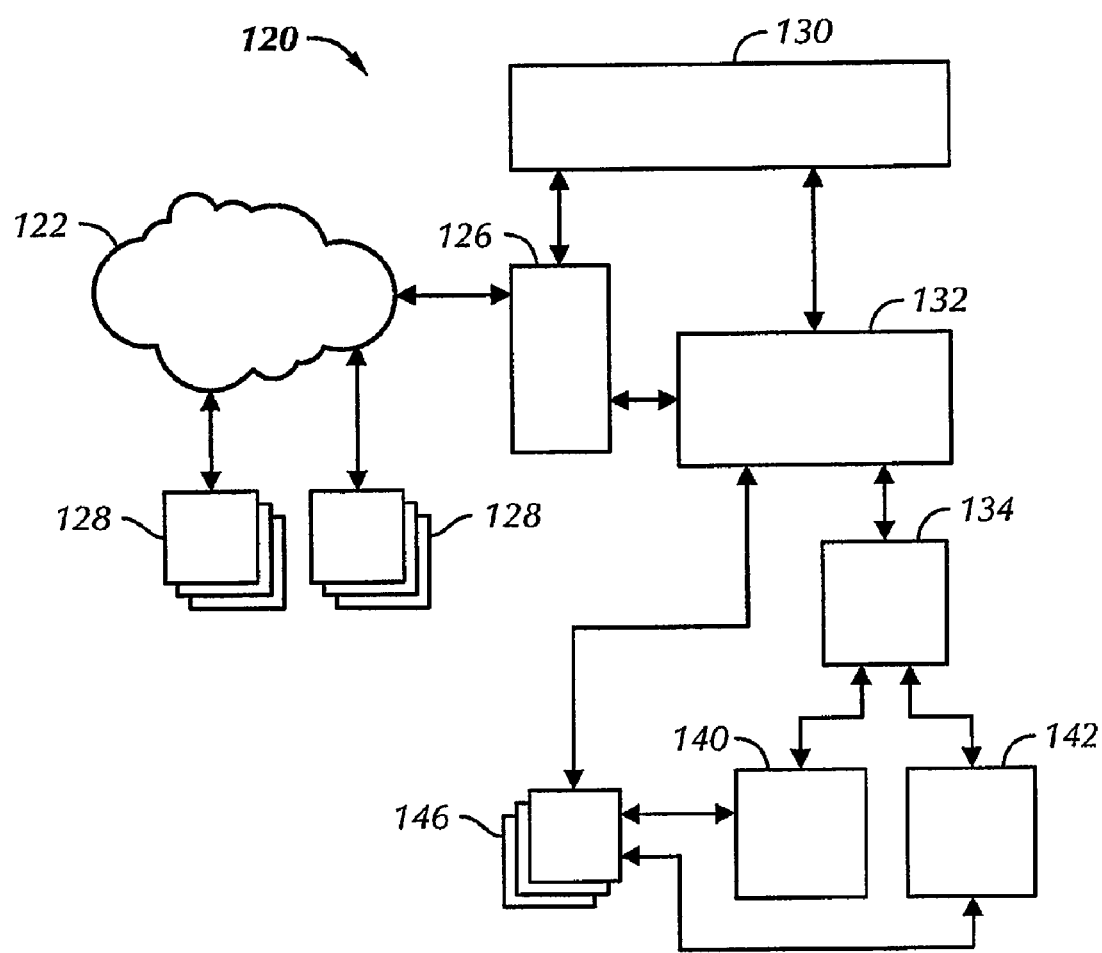
FIG. 1 depicts a simplified block diagram of an apparatus for providing data virtualization processing, such as data storage virtualization according to one embodiment of the present invention.

The following description is not to be taken in a limiting sense, but is made merely for the purpose of describing the general principles of the invention. The scope of the invention should be determined with reference to the claims.

The present invention provides a method, apparatus, network and system for data processing and data virtualization. In one embodiment, the present invention provides virtualization of data allowing multiple physical storage devices, such as hard disk drives, tape drives and other storage devices, to be combined arbitrarily. The virtualization provides improved performance over previous virtualization techniques as well as improving the reliability and maximizing the allowable storage. The invention is described herein as being utilized with data storage virtualization. However, the methods and apparatus described providing the virtualization can be equally applied to substantially a packet based I/O protocol and with substantially any device, system, apparatus and network such as, CPUs, printers, disk storage drives, tape drivers, intranets, the Internet and other such devices and networks.

In many data communication protocols, data is communicated in blocks or packets of information. Each packet includes a header to provide the network with routing and instructional information on the processing of the data within the packet.

Most storage devices deal with data at an input-output (I/O) level. For example, a network or computer controller may issue a READ command instructing data (for example 64 Kbytes of data) to be pulled from a storage device. The I/O READ command, considered a single I/O, is passed from the controller through the computer and/or network layering to the end storage device (e.g., end disk drive device). The end device extracts (reads) the entire 64K of data. The entire 64K of data is packaged up into a single packet with header information for routing of the I/O data. The entire 64K I/O is passed back up through the layers as a single I/O, all in one package. So each layer deals with the data as a full package of the entire 64 Kbytes. As data is received in a layer, the layer waits until all of the contents of the I/O packet (i.e., the entire 64K of data) to be received before continuing the processing and forwarding the data. This waiting for the entire I/O introduces excessively large amounts of latency in the processing of the data.

Many previous virtualization devices, for example redundant array of independent disks (RAID) controllers, are implemented as intermediate devices. They are incorporated within the data path and process the I/O as it passes along the path. As such, a RAID controller in operation receives a request (e.g., READ 64 Kbytes) and waits for the entire I/O to come to that single layer. Once the entire I/O is received, the RAID controller then proceeds to process the I/O and, for example, divides the I/O up or passes the I/O along to the next layer as a complete I/O. This waiting for the complete I/O introduces large latencies. In particular, each layer introduces latencies as each layer waits for the entire I/O to completely arrive before processing.

The present method and/or apparatus provide enhanced data virtualization and processing, in part, by processing the I/O as it is received and not waiting for an entire I/O to be received. As such, the excessive latency seen in previous virtualization devices is substantially avoided and typically eliminated. In one embodiment, the present invention avoids the latency by separating the command processing from the data processing. In one embodiment, the present invention avoids the latency by separating the processing of different types of protocol data units (PDU), packets or other subsets of data depending on the network or system protocol.

Typically, the present invention reduces the granularity at which the data processing is performed. This is in contradiction to many previous data processing and/or storage optimization techniques. Many previous systems attempt to improve performance by combining several I/Os to make a single large I/O that is communicated. This reduces the number of total I/Os that the previous systems issues theoretically reducing communication processing and time. However, these previous systems continue to introduce the latency, and in fact increase the latency by waiting for all of a plurality of I/Os to be received.

The present invention alternatively reduces the size of the units of data that are processed, reducing the latency and thus improving overall performance. In one embodiment, the present invention processes data at the PDU level (for example when operating with SCSI protocol), the packet level (for example when operating with Fibre Channel protocol) or other similar subsets of an entire I/O. However, the present invention can be implemented to process data at lower levels of granularity, for example, at the word chunk level, at the bytes level or other similar levels, to further reduce the latency.

The present invention additionally improves performance by parallelizing the processing of the smaller subunits of data (e.g., PDUs). By dividing I/Os into smaller subunits of data and parallel processing these subunits, the present invention further reduces the latency that occurs when operating at larger data levels, such as at the I/O level. In one embodiment, the parallel processing is achieved, in part, by providing cut through switching of the data. As such, the entire I/O does not have to be received before data can be cut and forwarded for processing while other data is being received, cut and processed.

FIG. 1 depicts a simplified block diagram of an apparatus 120 for providing data virtualization processing, such as data storage virtualization according to one embodiment of the present invention. The data virtualization apparatus 120 typically couples with a computer system or network 122. When operating with a network, the network can be an intranet, a fibre channel network, the Internet or other similar networks. Data is communicated between the computer system or initiator 128 and/or network 122 and a communication stack 126. The communication stack provides a protocol implementation. For example, the communication stack will ensure the data is in the proper protocol format, such as TCP/IP, Fibre Channel and other similar protocols.

A local management system 130 couples with the communication stack to provide control for the communication stack. The local management system additionally couples with a transport system 132. The transport system layer provides data flow control and attempts to provide error free communication of data. The transport layer additionally formats the data. The data can be in substantially any format or protocol. In one embodiment the apparatus 120 utilizes the iSCSI protocol. Alternatively, the apparatus 120 can be configured to utilize a generic format, where in-coming data being processed is initially converted from any format to the generic format for processing, and data being transferred from the apparatus is converted from the generic form to the needed format compatible with the network 122.

The transport layer couples with a logic unit 134. The logic unit receives in-coming data and determines if the data is a SCSI command or SCSI data (or similarly a Fibre Channel command or Fibre Channel data, or other protocol commands or data). The logic unit 134 separates the commands from the data. For example, if the received data is in a SCSI format, the commands received by the logic unit can be SCSI command/data blocks (CDB). The logic unit 134 separates the commands from the SCSI data. The commands are forwarded to a command and response unit 140 and the data is forwarded to a data engine 142.

The command unit 140 receives the commands through the logic unit 134 and processes the commands to determine which components of the system and/or network the commands and/or data are to be directed. The command unit determines the distribution of data to the subsystems or blocks 146, such as data storage devices, that are to receive data associated with the command, and subsystems or block from which data is to be pulled in response to the command. The command unit 140 organizes the virtualization distribution of the data.

Similarly, the command unit 140 takes a command that is associated with data to be received or already received by the apparatus 120 (e.g., data to be stored on a storage device) and generates one or more commands for the distribution of the received data. For example, if a command PDU is received with a WRITE command, the command unit 140 determines which storage devices are to receive data and how much each is to receive. The command unit then generates one or more virtual commands for one or more subsystems or devices 146 of the network 222. For example, the command unit can receive a command from PDU and generate three virtual commands for three different storage devices 146 to store a certain amount of data associated with the command into each of the three different storage devices. Similarly, the command can be a READ command, where the command unit 140 determines which of a plurality of storage devices 146 contains the desired information. The command unit 140 then generates one or more commands for the reading of the desired data.

As discussed above, the logic unit 134 additionally couples with a data engine 142. As data is received and the logic unit determines that the communication is a data PDU as apposed to a command PDU, the logic unit routes the data PDU to the data engine 142. The command unit 140 provisions the received command and issues one or more commands (virtual commands) that are forwarded to a data engine 142. The data engine utilizes the distribution or virtual commands to determine the virtualization of the data for distributing and allocating the data to one or more subsystems or devices 128 on the network. Thus the apparatus 120 provides virtualization through two device or engines, the command unit 140 and the data engine 142.

The data engine 142 and the command unit 140 couple with a physical volume driver 146. The command unit 140 forwards the distribution commands to the physical volume driver. As the PDU data is received by the logic unit 134, the logic unit directly forwards the data PDUs to the data engine 142. The data engine utilizes the commands to virtualize the data for the distribution over the physical storage devices and directs the data accordingly to one or more physical volume drivers.

The physical volume driver forwards the PDU data to the devices as designated by the command/response unit 140. Typically, the apparatus 120 includes a plurality of physical volume drivers 146. In one embodiment, the apparatus includes a physical volume driver for each actual initiator device 128 external to and coupled with the apparatus 220 and/or network 222. As such, the data engine 142 directs the data PDUs or parts of the data PDUs to the designated physical volume driver as instructed by the command/response unit 140. The physical volume driver then format the data for the particular driver and forwards the data back to the transport layer 132.

The transport layer receives the data PDUs and configures the data in the proper protocol according to the type of network communication to be utilized in forwarding the data, such as, SCSI, iSCSI, Fibre Channel or other communication protocols. The transport layer then transports the data back to the communication stack or other network device such that the data is forwarded to the network and the appropriate initiator device 128.

The apparatus operates similarly with READ requests. A READ request enters the apparatus 120 through the communication stack 126 or other network device. The communication stack forwards the request to the transport layer for accurate protocol conversion. The request is forwarded to the logic unit 134 where the one or more read command PDUs are identified (versus one or more read data PDUs). The command PDUs are forwarded to the command unit 140. The command unit determines what storage device 146 contains the desired data and/or information to be read. The command/response unit generates one or more virtual commands that are forwarded to the data engine 142.

The data engine forwards data PDUs associated with the READ to the appropriate one or more physical drivers 146. Again, because the command PDUs are separated from the data PDUs, the logic unit 134 receives data PDUs and directly forwards those PDUs to the data engine. The data engine can then directly process the data PDUs without waiting for the entire request I/O to be received, significantly reducing the latency of data processing.

The physical volume drivers direct the READ request data to the transport layer to be forwarded over the network 122 to the appropriate one or more initiators 128. The one or more initiators receive the READ request and begin to read the desired data.

As the data is read from the appropriate driver devices 146 and is forwarded back to a requesting device, the data is formatted by the transport layer and forwarded back to the data engine 142. Because the READ command PDUs have already been processed, the data engine quickly determines the routing to each of the one or more devices 128, replaces unnecessary header information with appropriate destination header information and forwards the data to the requesting device. In some embodiments, where the device requesting the READ data requires the data to be delivered in a proper sequence, the data engine compiles received read data into a proper sequence if the data is received out of order. However, if the requesting device does not require a proper sequence, the data engine directly routes the data according to the virtual commands.

Figure 2A:
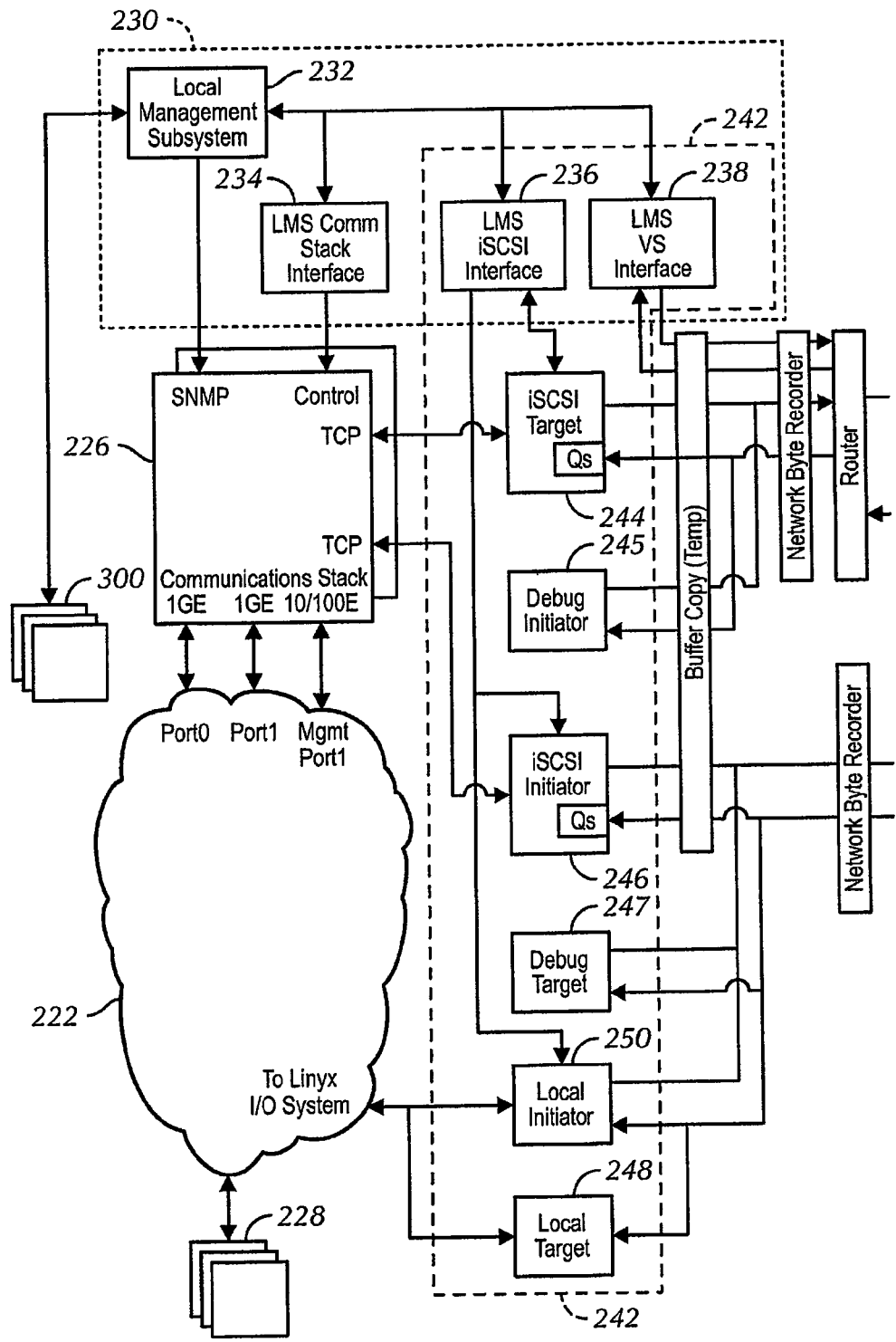
FIGS. 2A and 2B (which are collectively referred to herein as FIG. 2) depict a simplified block diagram of an apparatus for providing data virtualization according to one embodiment of the present invention.
Figure 2B:
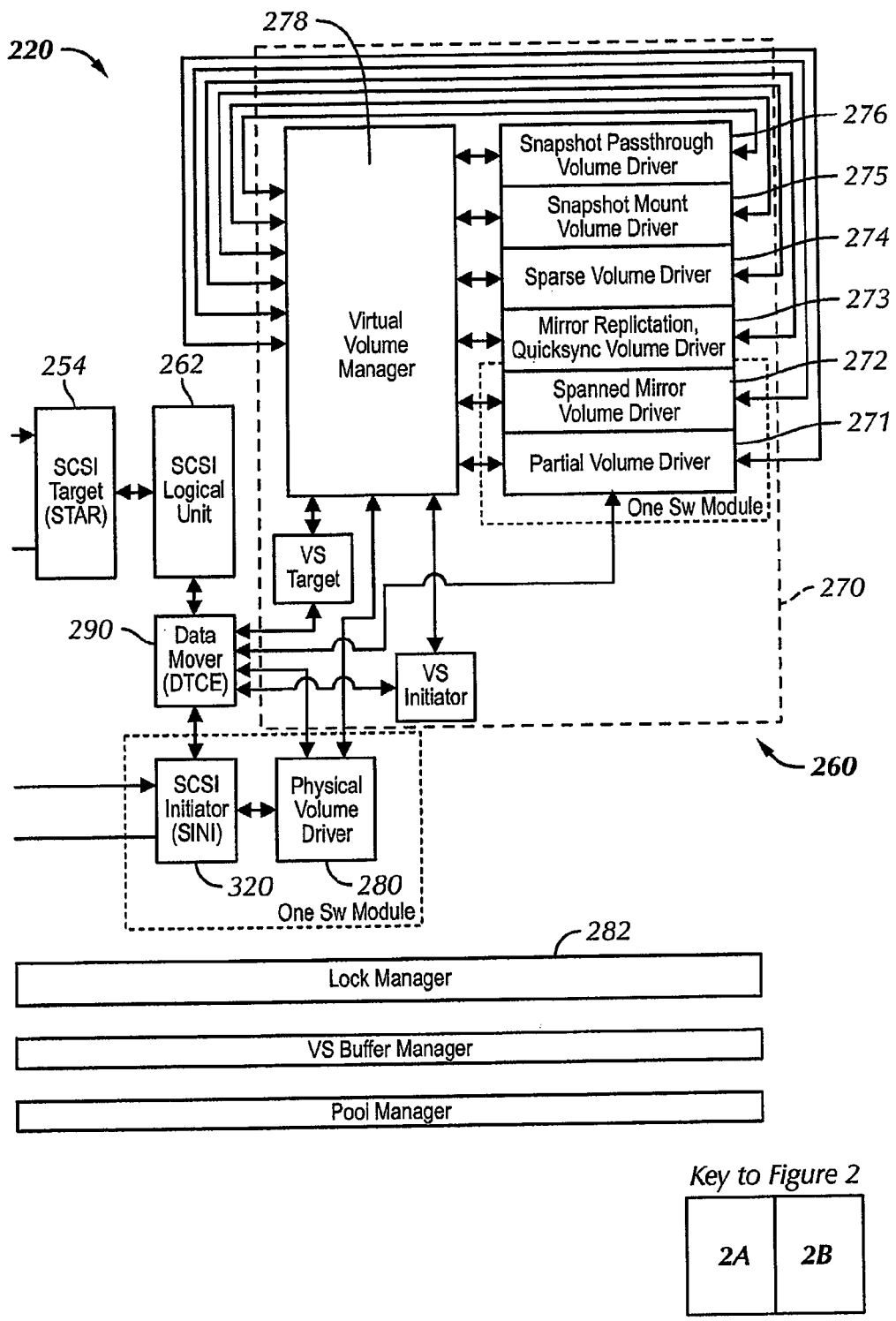

FIGS. 2A and 2B (which are collectively referred to herein as FIG. 2) depict a simplified block diagram of an apparatus 220 for providing data virtualization according to one embodiment of the present invention. The apparatus significantly reduces latency and improves the speed at which data is processed by, in part, separating command processing from data processing providing parallel processing. For example, in some embodiments, the apparatus operates on SCSI or iSCSI protocol data, and as such can separate command PDUs from data PDUs. Typically the apparatus is implemented through a combination of software and hardware. However, the apparatus can be implemented almost exclusively through software, or almost exclusive through hardware.

The apparatus 220 couples with a computer, system and/or network 222 allowing data to be communicated to and from the apparatus. The apparatus virtualizes data allowing any number of subsystems or initiator devices 228 to be coupled with the system or network 222 to cooperate and to appear as a single device. The present apparatus provides enhanced data throughput and improved reliability through, in part, parallel processing and performing data processing at lower or smaller granularity than previous systems.

Data is received by and distributed from the apparatus through a communication stack 226. A local management system (LMS) 230 couples with both the communication stack and the transport layer. The local management system provides control for the operation of the apparatus 220 and the control of components of the apparatus. In some embodiments, the local management system provides external access 300 to the apparatus 220 to allow the apparatus to be monitored, to be updated and to allow parameters to be set and changed as conditions change. For example, a system administrator can access, adjust and/or update the apparatus utilizing the LMS 230.

The local management system 230 can include a local management subsystem 232 that provides control over the subcomponents of the system. A local management system communication stack interface 234 couples with the local management subsystem and the communication stack 226 and provides a communication link between the subcomponents of the LMS.

The LMS additionally includes a transport protocol control interface 236. The LMS transport protocol control interface provides communication between the LMS and the transport protocol layer or block 242. The LMS transport control protocol interface 236 additionally provides a communication link between the communication stack 226 and the other elements contained in transport block 242. As such, the communication stack can provide configuration information, such as the initial protocol setup (TCP/IP, Fibre Channel and other similar protocols) and other implementation specific parameters. For example, the LMS transport protocol control interface 236 can control an iSCSI interface providing communication and/or protocol conversion between the communications stack 226 and the transport layer 244 when the transport layer is configured to operate utilizing the iSCSI protocol.

In some embodiments, the LMS 230 additionally includes an LMS virtualization system interface 238 that provides communication and/or control to a virtualization subsystem 270 of the apparatus 220. In one embodiment, the LMS virtualization system interface 238 initiates and/or receives control feedback information from the virtualization subsystem 270. The LMS virtualization system interface also provides control communication between the communications stack and the virtualization functional portions of the apparatus 220.

Data is directed between the communication stack 226 and the transport block or layer 242. The LMS transport control interface 236 and the LMS virtualization interface 238 can additionally provide transport functionality. As such, the LMS transport interface and virtualization interface can also be considered as part of the transport block 242. The transport block can also include a protocol target unit 244 and a protocol initiator 246 providing a communication target or destination (e.g., the target of PDU communications) and communication initiation (e.g., the initiation of PDU communications), respectively. For example, when operating through iSCSI protocol, the target unit is an iSCSI target unit 244 and the initiator is an iSCSI initiator unit 246.

The protocol target 244 receives data requests and commands and forwards those requests and/or commands to the virtualization functional components. In some embodiments, the protocol target unit 244 receives the requests and/or commands and generates new requests and/or commands in an alternate protocol, for example, from iSCSI to SCSI, from Fibre Channel to SCSI, from Fibre Channel to a generic protocol, or other similar conversions.

The protocol initiator 246 can generate commands and/or requests to external components 228 in or coupled with the network 222. For example, the protocol initiator 246 can be an iSCSI initiator generating commands to iSCSI data storage units as directed according to the virtualization provided by the apparatus 220 as described fully below.

In some embodiments, the transport block 242 additionally includes a local initiator 250 and local targets 248. The local target and initiator provides the present apparatus 220 with legacy compatibility. Because many network components 228 (e.g., CPUs, storage devices and other legacy components) continue to operate in I/Os, the present invention can include the local target and initiator 248, 250 that communicate over the network 222 utilizing I/Os, such as utilizing the Fibre Channel or parallel SCSI protocols. This allows the present invention to virtualize data utilizing legacy devices, and thus allowing users and/or customers to take advantage of previously invested equipment. The use and operation of the local target and initiator 248, 250 are described more fully below.

The apparatus 220 typically also includes an internal protocol target unit 254. The internal protocol target unit receives data, requests and/or commands issued through the transport block 242 and detects and/or extracts communications recognized as having the predefined internal protocol. For example, the internal protocol target unit can be a SCSI target unit 254 that pulls out communications recognized as SCSI. Typically, the internal protocol target unit does not process or concern itself with what is in the communication (e.g., SCSI communication). The internal protocol target 254 simply determines if a communication is or is not an internal protocol communication (e.g., SCSI command (CDB) PDUs, SCSI data PDUs, SCSI R2T PDUs, SCSI Response PDUs and other similar communications).

Communications recognized by the internal protocol target 254 are forwarded to a logic unit 262 of the virtualization subsystem or functional block 260. The logic block 262 is configured to analyze the communications forwarded by the internal protocol target 254 and determine if the communication is a command communication or a data communication. For example, when utilizing the SCSI protocol the logic block 262 determines if the communication contains one or more command PDUs and/or one or more data PDUs. The logic unit separates the command communications and forwards them to a command and/or response unit 270. The logic unit additionally separates out the data communications and forwards them to a data engine 290. In one embodiment, the logic unit utilizes the headers on the communications to help distinguish command versus data communications. The separation of the commands and the data allows the present invention to process the commands separately and thus allows the data to be processed in parallel and to be passed directly through as it is received without the latency of previous systems waiting for a complete I/O to be received, significantly improving the data processing performance of the apparatus 220.

The command unit 270 receives the command communications and determines the virtualization of data associated with that command. For example, if the command requests that data be retrieved from storage, the command unit 270 can determine how the requested data has been virtualized and distributed, and thus identify the one or more storage devices utilized to store the data. The command unit 270 can then generate one or more commands instructing the retrieval of the requested data. The command unit 270, at least in part, configures the relationship between a host or other device issuing the command PDU and a subsystem or other device of the network (e.g., data storage device, printer and other devices).

The command unit 270 includes a virtual volume manager 278. The virtual volume manager receives the command communications (e.g., command PDUs) and proceeds to process the command communications to determine the virtualization of the data associated with the command. In processing the commands, the virtual volume manager 278 coordinates with one or more virtual volume drivers 271-276. The PDU includes information allowing the virtual volume manager to determine which of the virtual driers are to be accessed. For example, a logical unit number (LUN) or other similar information can be extracted from a command and utilized. The command PDU, or a portion of the PDU relevant to a particular virtual driver, is forwarded to one or more of the virtual volume drivers 271-276. Between the virtual volume manager 278 and the virtual drivers the distribution of the data is determined. The virtual drivers 271-276 are used to combine backend or physical commands such that the plurality of physical devices (e.g., storage devices, mirror storage devices, printers and other devices) appear as a single device to a host or other device submitting the command.

The virtual volume manager receives a command and determines to which of the virtual drivers are the command is to be routed. Once determined, the command is forwarded to the appropriate virtual driver or drivers. The virtual drivers then generate one or more commands for the one or more physical devices associated with the virtual volume. Additionally, the virtual drivers can also be layered such that a virtual driver can determine that a command is to additionally be forwarded to other virtual volume.

For example, a WRITE command data portion can be received, separated and forwarded to the virtual volume manager 278. The virtual volume manager determines that the command should be directed to a first virtual driver, for example, a partition volume driver 271. The partition volume driver can then determine that the data is to be distributed to a plurality of physical storage devices (e.g., three storage devices), and proceeds to generate virtual commands for each of the three devices. The virtual partition volume driver 271 can also determine that the data associated with the command is to be mirrored. As such, the partition volume driver can forward the command or the relevant portion thereof to a virtual mirror volume driver 273. The mirror volume driver then generates one or more virtual commands for the mirroring of the corresponding data.

Alternatively, during the processing of the command, the virtual volume manager 278 could determine that the data is to be spanned as well as mirrored. As such, the virtual volume manager forwards the command or relevant portion(s) of the command to both the spanned mirror driver 272 and the virtual mirror volume driver 273. Other virtual drivers can be utilized, such as, a virtual sparse volume driver 274, a virtual snapshot mount volume driver 275, a virtual snapshot pass-through volume driver 276 and substantially any other virtual volume driver.

In some embodiments, the virtual volume manager 278 utilizes one or more look up tables to determine the distribution and virtualization of the command. In one embodiment, the virtualization volume manager 278 includes a look up table for each initiator of the system or network 222 coupled with and accessing devices 228 through the present virtual data processing apparatus 220. As such, a command PDU is looked up in a table limited to a specific initiator, as apposed to a global list. This provides a permission and/or protection structure to the data processing and or devices accessed through the apparatus 220. In some embodiments, the processing of the commands and/or the generation of virtual commands can be implemented, at least in part, through known RAID (redundant array of independent disks) techniques.

Typically, the one or more tables utilized to determine the distribution of the command and the generation of virtual commands is initially provisioned at some point during the configuration of the apparatus. For example, one or more host or command issuing devices (e.g., CPUs, servers, or applications) can be configured to forward or request data to or from one or more subsystems or devices managed by the apparatus 220. Through a discovery process the available subsystems and/or devices are presented to the LMS 230 or other network controllers. The hosts are then provisioned access to and an amount of the subsystem resources that can be utilized by each host. For example with data storage subsystems, hosts can be configured to have access to all or a subset of the available storage subsystems. Each host is provisioned a portion of the storage pool available from the subsystems (e.g., host A is provisioned 100 GBytes of the available storage). When the provisioned host (e.g., host A) generates a command and/or data (e.g., WRITE 30 MBytes of data N), the WRITE command is routed by the logical unit 262 to the command unit 270. The virtual volume manager 278 accesses the table associated with the specific host and determines which virtual drivers 271-276 are to process the command to generate virtual commands (e.g., virtual partition volume driver 271 generates a command to WRITE 10 Mbytes to each of three physical storage devices.

Once the virtual commands are generated through the virtual volume manager 278 and the virtual drivers 271-276, the virtual commands are forwarded to the data mover 290 and one or more physical volume drivers 280. The physical volume driver drives the local target subsystem(s) 248, such as the actual storage device(s). Typically, the apparatus 220 includes a physical volume driver 280 for each type of physical subsystem being accessed.

In processing and virtualizing data (e.g., data PDUs) the data mover 290 is configured to route data according to the virtualization established by the command unit 270. The data engine is configured to receive data communications from the logical unit 262 and to directly forward the data out to the appropriate external subsystem or subsystems 248 according to the virtual commands. The data mover does not wait for an entire I/O to be received. Alternatively, as data is received it is directly virtualized to the appropriate subsystem(s).

In one embodiment, the data mover 290 provisions itself utilizing the virtual commands. Because the commands are virtualized separate from the data and forwarded to the data mover, the data mover receives virtual commands, provisions itself in preparation to process received data associated with the virtual commands. For example, the data engine can generate one or more routing or switching tables according to the virtualized commands. As data is received, the data engine utilizes header information from, for example, the data PDU to reference one or more data switching table.

In some instances, data is received prior to commands, or prior to the completion of the virtualization of the commands. When the data mover 290 receives data communications from the logic unit 262, the data engine determines if a switching table has already been configured for this data communication. If a table has not been established (for example, because a command PDU associated with this data PDU has not yet been fully virtualized by the command unit 270 and/or received by the data engine) then the data mover holds the data until the data mover is configured according to the virtualized commands. It is noted that the amount of time the data mover holds data is typically very minimal compared with the latency that would result if the data engine had to wait for the entire I/O. However, in a majority of instances, the data mover 290 will have already received the virtualized commands and established a switching table when the data PDU arrives, and as such the data engine quickly determines the virtual routing and immediately directs the data out without waiting for further data or the entire I/O to arrive.

In generating data virtualization tables, the data mover 290 utilizes the virtualization commands. Once a data communication (e.g., data PDU) is received, the data mover utilizes header information or other information to determine which table to utilize and how to interpret the table as related to the received data. The data mover then forwards virtualized data according to the tables. For example, the data engine can break or split a data PDU into a plurality of sub-blocks or a plurality of virtual PDUs. In forming the sub-blocks or virtual PDUs, the data mover can modify, add a new, or replace header information (for example, utilizing a predefined I/O tag), and direct each of the plurality of virtual PDUs to separate external subsystems 248.

For example, when the data mover 290 is providing data processing for data to be written according to a WRITE command the data mover initially extracts or reads the header. The data mover utilizes the information within the header to access and interpret one or more switching tables. The tables define what to do with the data at that point to virtualize the data, including configuring the data by, for example, putting a new header on it, potentially splitting the data and putting multiple headers on various parts of the data or other similar configurations. The data engine 290 then issues the virtualized data to the transport to be deliver to the destination device.

As another example, when virtualizing data communications associated with a READ command, the READ data itself is directed through the logic unit 262 and straight into the data mover. Typically, the command unit 270 has already virtualized the commands and the data engine has already established one or more switching tables associated with the READ data. The switching tables direct the data engine to read from one or more external subsystems or devices 248. The data engine then replaces headers on the data and immediately directs the data out to the transport to be directed back to the requesting device.

The data mover is configured such that it does not collect all the READ data prior to directing the data out. Once data is received and it is determined how the data is to be routed, the data mover releases the data. However, the data mover is typically configured to follow negotiated protocol parameters. As is known, there are some protocols that require data to be sent back in a proper sequence or order to the initiator. When operating under these parameters, the data engine can be configured to gather data that is received out of order and wait for the out of sequence portion(s) of the data, and then release the data in order. The data engine only holds data until it is in order then immediate directs the ordered data out according to the virtual commands. Therefore, the data mover 290 is configured to pass the data along within the negotiated parameters or rules. It is noted that the amount of time required to hold the data until it is in order is typically minimal compared with the latency resulting through previous systems requiring the receipt of an entire I/O before processing. It is very rare that the data PDUs would be out of order to such a degree than the entire I/O would have to be received before the data was in sequence. However, when the negotiated parameters allow data to be sent out of order, then the data engine optimizes the processing and minimizes the latency by directly routing data communications out as they are received, in order or out of order.

In separating the virtualization into two separate processes the present invention establishes an extremely short data path. Because the large majority of communications are data communications the present invention optimizes the performance by minimizing the data path as well as minimizing the data latency. In some embodiments, the data engine can in part function as a cut-through switch receiving data and immediately virtualizing and forwarding the data according to the virtual commands.

In one embodiment, the one or more physical volume drivers 280 and the data mover 290 both couple with an internal protocol initiator 320. The initiator 320 operates similar to previous initiators. However, the internal protocol initiator 320 does not accumulate PDUs. The initiator 320 simply forwards the PDUs as they are received from the physical volume drivers and/or data engine.

The internal protocol initiator 320 couples with the transport block 242. Depending on the implementation of the present data virtualization apparatus 220 and the external devices 228 communicating through the apparatus, the PDUs forwarded through the internal protocol initiator 320 are directed to an external protocol initiator 246 or to a legacy initiator 250. The external protocol initiator provides protocol conversion to an external network protocol if needed (e.g., from SCSI to iSCSI, Fibre Channel or other protocol conversions) and forwards the PDUs as they are received to the destination device as dictated through the virtualization system 260. As such, the components 228 on the network (e.g., CPUs, other hosts, data storage devices) receive the PDUs without the latency of waiting for an entire I/O.

The local initiator 250 provides legacy compatibility as discussed above. In some implementations, the communications (e.g., PDUs) are to be directed to existing or legacy devices that operate in complete I/Os, e.g., some storage devices. In some embodiments, the local initiator 250 can couple with a Linux I/O system of the network 222 to direct the virtual PDUs as a single virtual I/O to legacy devices. Therefore, the local initiator 250 is configured to accumulate and/or buffer the virtual PDUs at the back end of the apparatus 220 until all PDUs to complete an I/O are received. Once received the local initiator 250 forms the PDUs into a single I/O and directs the I/O to the legacy destination device 248.

The present invention still typically provides increased data processing and virtualization over previous systems even when the accumulation and/or buffering of the PDUs at the back end is implemented for legacy compatibility. The latencies introduced at the back end are still typically less than those of previous data processing devices because the present invention does not have to wait for an entire I/O at the front end before beginning to process the I/O. To the contrary, the present invention advantageously begins to process the command PDUs as soon at they are received and separated to the command unit 270 allowing the data PDUs to be immediately processed and forwarded when received. Thus, the data is virtualized and forwarded without waiting, and the only latency is waiting at the back end for the virtualized PDUs to establish a virtualized I/O.

The transport block 242 can additionally include a local target 248. The local target 248 also provides legacy compatibility by allowing the apparatus 220 to be a target for legacy initiator devices 228 on the network 222.

Still referring to FIG. 2, in some embodiments the present apparatus 220 can be coupled with one or more similar data virtualization apparatuses 300 providing the same or similar virtualization functionality as the virtualization apparatus 220. The coupling and cooperation with other virtualization apparatuses 300 can be achieved through the network 222 or through direct coupling. Additionally, the LMS 230 of each cooperating apparatus can couple with one or more LMSs of other apparatuses directly or through the network. The cooperating LMSs can communicate to coordinate the processing and virtualization of data. This cooperation provides for scalable processing. In some embodiments, the cooperating virtualization apparatuses 220, 300 can share command virtualization tables and/or data virtualization tables utilized by the virtual volume manager 278, virtual volume drivers 271-276 and/or the data mover 290. The sharing of virtualization tables improves efficiency and optimizes consistency. Further, the LMS 230 can coordinate and distribute virtualization to optimize the performance of a plurality of apparatuses 220.

Utilizing a plurality of apparatuses allows parallel processing while maintaining strict control over the virtualization of the system or network resources. Additionally, the cooperation allows one overburdened apparatus to direct communications (data and/or command) to an alternate under-utilized or less burdened apparatus to provide data processing and virtualization. As such the present invention provides scaling of the data processing and virtualization. This further increases the speed and thru put of the present invention. Network resources can be optimized and thus a maximum speed can be achieved and maintained. Additionally, it allows networks to grow and expand without over burdening a single resource. As existing virtualizing apparatuses 220, 300 of a network begin to consistently reach capacity, one or more additional data virtualization apparatuses 220, 300 can be added to the network to further distribute the processing load.

In embodiments capable of coordinating and cooperating with other virtualization apparatuses, typically, at least one of the cooperating apparatuses 220, 300 includes a lock manager 282. The lock manager provides synchronization between the plurality of apparatuses 220, 300 on a system or network 222. Typically, the lock manager 282 of one apparatus communicates with the lock manager of a second apparatus to coordinate, synchronize and parallelize the processing and virtualization. The lock managers synchronize the cooperation allowing the apparatuses to operate at a maximum speed and thru put.

Still referring to FIG. 2, in one embodiment, the transport block 242 includes a debug initiator 245 and a debug target 247. The debug initiator and target 245, 247 allow the apparatus to be tested and run self diagnostic operations. The debug initiator and target appear as external devices to the virtualization subsystem 270 For example, the debug initiator 245 can initiate a command that is virtualized and processed by the apparatus 220. The apparatus then directs the virtualized results to the debug target 247. The LMS 230 typically couples with the debug initiator and target 245, 247 to initiate the diagnostic and to analyze the results received through the target 248.

Figure 3:
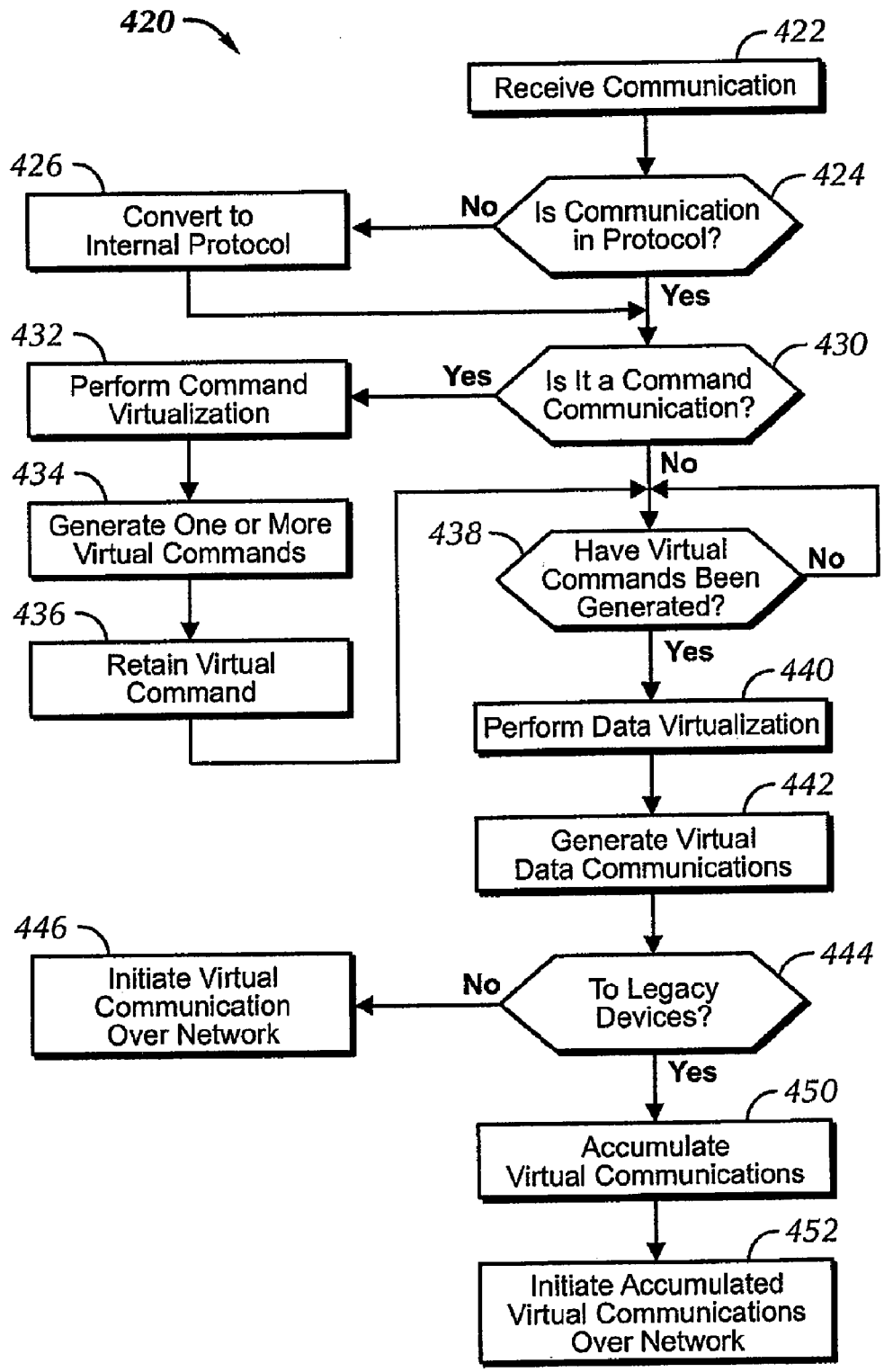
FIG. 3 depicts a simplified flow diagram of a process for performing data processing and/or virtualization according to one embodiment of the present invention.

FIG. 3 depicts a simplified flow diagram of a process 420 for performing data processing and/or virtualization according to one embodiment of the present invention. In step 422, a communication is received (e.g., one or more data or command PDUs). In step 424, the process determines if the communication is in a protocol utilized within the data processing apparatus 220. If not, step 426 is entered where the protocol of the communication is converted to an internal protocol. Following step 426, or if it was determined that the communication was originally in the internal protocol in step 424, the process proceeds to step 430 where it is determined if the communication is a command or a data communication. If the communication is a command, the process 420 proceeds to step 432 where command virtualization is determined. In step 434, one or more virtual commands (V. Comm.) are generated based on the originally received command communication.

In step 436, the virtual commands are retained, for example, compiled in one or more virtualization tables.

If it is determined in step 430 that the communication is a data command, the process proceeds to step 438 where it is determined if virtual commands have been generated for the received data commands. If not, the process loops back to step 438 until virtual commands are generated. In step 440 the data virtualization is performed according to the virtual commands. In step 442 virtual data communications are generated for example, virtual PDUs are generated with new headers and/or I/O tags. In step 444 it is determined if the virtual data communications are to be directed to legacy devices. If they are not, the process proceeds to step 446 where initiation of the transfer of the virtual communications are forwarded over the network 222.

If it is determined in step 444 that the virtual communications are to be directed to legacy devices, then step 450 is entered where the virtual communications are accumulated until an entire I/O is collected. Once collected, step 452 is entered where a transfer of the virtual I/O is initiated to local targets 248.

Figure 4:
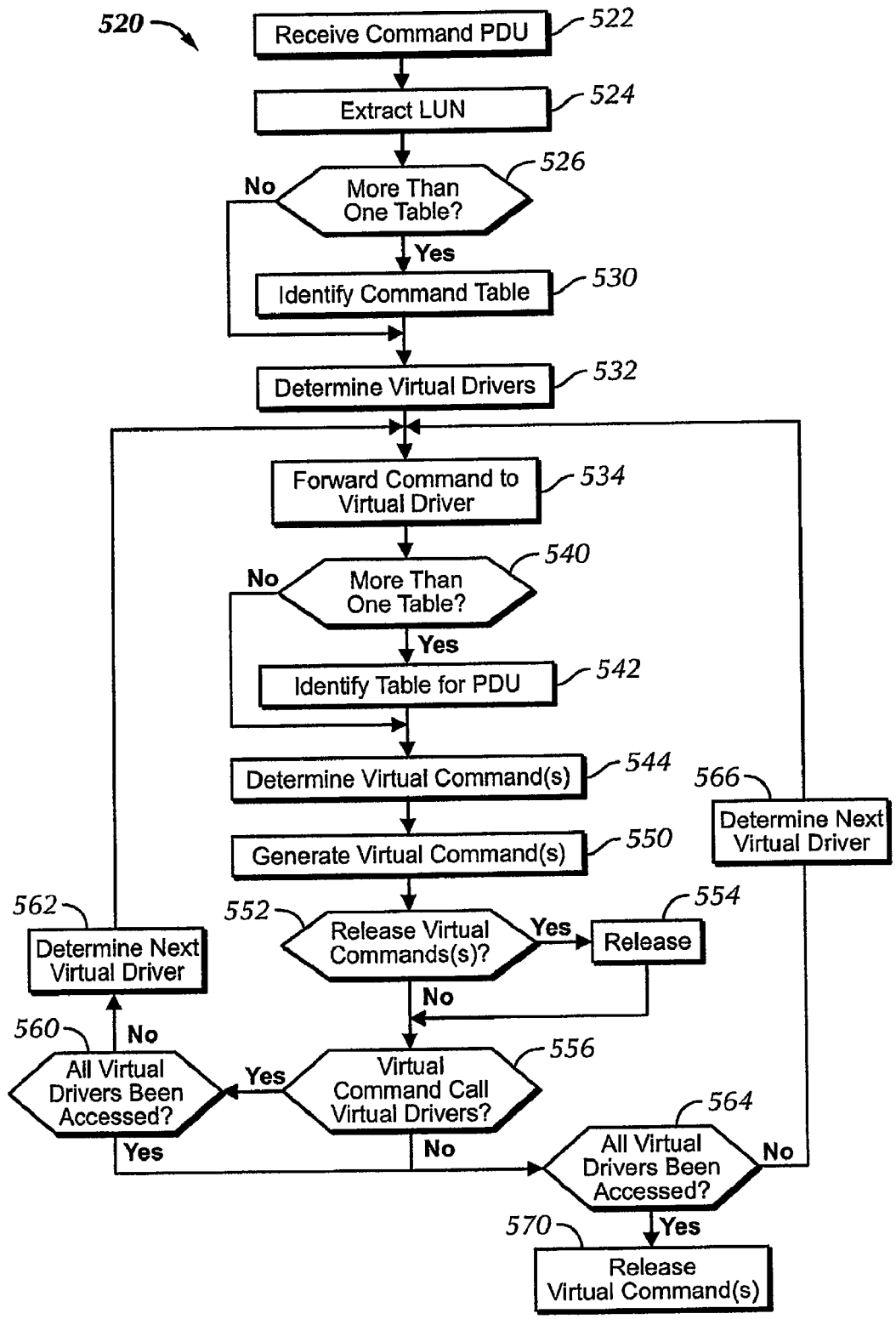
FIG. 4 depicts a simplified flow diagram of a process for the virtualization of command communications.

FIG. 4 depicts a simplified flow diagram of a process 520 for the virtualization of command communications (e.g., command PDUs). This process for virtualization of the communication commands is an example of one implementation for steps 432 and 434 of process 420 for data processing shown in FIG. 3. In step 522, the command communication is received and forwarded to the command unit 270 (see FIG. 2). In step 524 the control information is extracted from the command. For example, when the process is operating using SCSI and the command communication is a command PDU, the LUN information can be extracted from the header of the command PDU.

In step 526, it is determined if there is more than one command virtualization table to be referenced for the received command. If not, the process proceeds to step 532. If there is more than one table, the process proceeds to step 530 where the proper table is identified. In step 532, it is determined which of one or more virtual drivers 271-276 are to be references according to the command. Once determined, the command is forwarded to one of the identified virtual drivers in step 534.

In step 540 it is determined if there is more than one virtual driver command table. If there is not, the process proceeds to step 544. If there is more than one virtual driver table, the process 520 proceeds to step 542 where an appropriate virtual driver table is identified. In step 544, an identified virtual driver table is utilized to determine one or more virtual commands to be generated in response to the received command communication. In step 550, the one or more virtual commands associated with the virtual driver are generated. In step 552 it is determined if the one or more virtual commands can be released to the data mover 290 and/or physical volume driver 280. If yes, then one or more virtual commands are released in step 554.

Following step 554, or if the commands cannot be released in step 552, step 556 is entered where the process 520 determines if one or more of the generated virtual commands call additional virtual drivers 271-276 (see FIG. 2). If the virtual commands do call additional virtual drivers, step 560 is entered where it is determined if all of the virtual drivers referenced by the virtual commands have been accessed for virtual command generation. If not, step 562 is entered where the next virtual driver referenced in the virtual commands is accessed. The process then proceeds to step 534 to forward the virtual command to the next referenced driver for processing of further virtual commands.

If in step 556 it is determined that none of the virtual commands reference an alternative virtual driver, or in step 560 it is determined that all virtual drivers referenced by virtual commands have been accessed, then step 564 is entered where it is determined if all of the virtual drivers referenced in the command table associated with the original command communication have been accessed. If not, step 566 is entered where the next virtual driver is determined and the process 520 proceeds to step 534 to forward the original command communication to the next referenced virtual driver for processing of further virtual commands. If in step 564 all of the virtual commands have been accessed for a given command communication, then the process proceeds to step 570 where the virtual commands are released if they were not already released in step 554.

Figure 5:
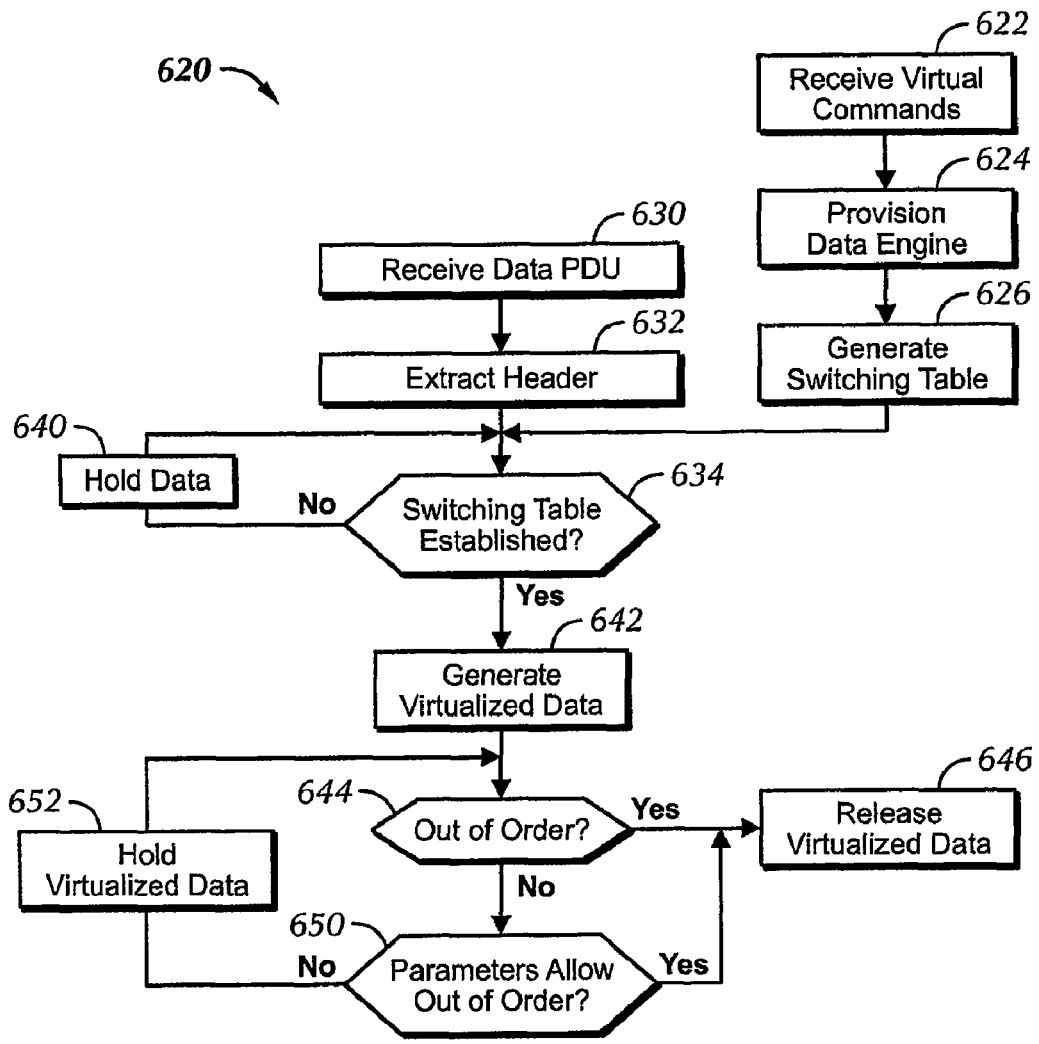
FIG. 5 depicts a simplified flow diagram of a process for generating virtualized data based on received data PDUs and dictated by virtual commands.

FIG. 5 depicts a simplified flow diagram of a process 620 for generating virtualized data based on received data PDUs and dictated by virtual commands. In step 622, one or more virtual commands are received. In step 624, the data engine is provisioned according to the virtual commands. In step 626, one or more switching tables are established or updated.

In step 630, a data PDU is received. In step 632, the header of the data is extracted. In step 634, utilizing the header information, the process 620 determines if a switching table exists and has been provisioned for the received data PDU. If not step 640 is entered where the data is held. The process then returns to step 634 until the switching table for the data has been established, updated and/or provisioned.

If it is determined that a switching table has been established for the data in step 634, step 642 is entered where the data PDU is virtualized according to the virtual commands as provisioned within the switching table, for example generating a plurality of virtual data PDUs and adding new header information onto each virtual data PDU. In step 644, the process determines if the virtual data is in a proper sequence. If the virtual data is in a proper sequence step 646 is entered where the virtual data is released to be transported to the destination device.

If the data is found to be out of sequence in step 644, step 650 is entered where it is determined if the receiving device parameters and/or network parameters are such that the virtual data can be forwarded out of sequence. If the virtual data cannot be forwarded out of sequence, step 652 is entered where the virtual data is held and the process returns to step 644 to determine if the missing data is available and thus the data is in order. If the virtual data can be forwarded out of sequence, the process 620 proceeds to step 646 where the virtual data is released.

The present invention provides data processing and virtualization by separating out and parallel processing commands from data. Further, the present invention operates on smaller units of data and previous systems. Operating at a finer granularity allows the present invention to avoid excess latencies that result in previous systems waiting for larger units of data. Further, operating on the smaller units of data is completely opposite to many previous devices that attempt to speed up performance by combining large units of data into larger units of data to reduce the number of transfers of data. This greatly increases the latency of previous systems. Alternatively, the present invention does not wait for an entire unit (e.g., an entire I/O) of data to arrive before the processing and virtualization is initiated. Therefore, the present invention is capable of processing and virtualizing data at much faster rates and eliminates the latencies associated with waiting for an entire I/O to be received.

While the invention herein disclosed has been described by means of specific embodiments and applications thereof, numerous modifications and variations could be made thereto by those skilled in the art without departing from the scope of the invention set forth in the claims.

What is claimed is:

1. An apparatus for data virtualization, comprising:
    a first parallel virtualization subsystem configured to separate first data communications from first command communications and to parallel process the first command communications and the first data communications, to generate at least one first virtual command and to generate first virtual data according to the at least one first virtual command; and
    a first physical volume driver coupled with the first parallel virtualization subsystem, wherein the first physical volume driver receives the first virtual data and configures the first virtual data;
    wherein the first parallel virtualization subsystem is further configured to generate the first virtual data according to one or more switching tables established according to the at least one first virtual command.

2. The apparatus as claimed in claim 1, wherein the first parallel virtualization subsystem comprises:
    a command unit configured to receive the first command communications and to generate the at least one first virtual command based on the first command communications; and
    a data engine coupled with the command unit, wherein the data engine is configured to receive the at least one first virtual command, to receive the first data communications and to generate the first virtual data as dictated according to the at least one first virtual command.

3. The apparatus as claimed in claim 1, further comprising:
    a second parallel virtualization subsystem configured to separate second data communications from second command communications and to parallel process the second command communications and the second data communications, to generate at least one second virtual command and to generate second virtual data according to the at least one second virtual command; and
    a second physical volume driver coupled with the second parallel virtualization subsystem, wherein the second physical volume driver receives the second virtual data and configures the second virtual data.

4. The apparatus as claimed in claim 3, further comprising:
    a network, wherein the first and second parallel virtualization subsystems couple with the network such that data virtualization is distributed across the network.

5. The apparatus as claimed in claim 3, further comprising:
    a management system configured to coordinate cooperation between the first parallel virtualization subsystem and the second parallel virtualization subsystem in performing data virtualization.

6. The apparatus as claimed in claim 3, further comprising:
    a lock manager configured to provide synchronization between the first parallel virtualization subsystem and the second parallel virtualization subsystem for assisting cooperation between the first and second parallel virtualization subsystems in virtualizing data.

7. The apparatus as claimed in claim 1, further comprising:
    means for coordinating cooperation between the first parallel virtualization subsystem and a second parallel virtualization subsystem in performing data virtualization.

8. The apparatus as claimed in claim 1, further comprising:
    a lock manager configured to provide synchronization between the first parallel virtualization subsystem and a second parallel virtualization subsystem for assisting cooperation between the first and second parallel virtualization subsystems in virtualizing data.

9. The apparatus as claimed in claim 1, wherein the first parallel virtualization subsystem is further configured to generate the first virtual data prior to receiving all data associated with the first data communications.

10. The apparatus as claimed in claim 1, wherein:
the first parallel virtualization subsystem comprises a plurality of virtual volume drivers; and
the first parallel virtualization subsystem is further configured to determine which of the plurality of virtual volume drivers should be used to generate the at least one first virtual command.

11. The apparatus as claimed in claim 1, wherein the first parallel virtualization subsystem is further configured to determine if data resulting from a READ request is in a proper sequence.

12. An apparatus for data virtualization, comprising:
a first parallel virtualization subsystem configured to separate first data communications from first command communications and to parallel process the first command communications and the first data communications, to generate at least one first virtual command and to generate first virtual data according to the at least one first virtual command;
a first physical volume driver coupled with the first parallel virtualization subsystem, wherein the first physical volume driver receives the first virtual data and configures the first virtual data; and
a management system configured to coordinate cooperation between the first parallel virtualization subsystem and a second parallel virtualization subsystem in performing data virtualization;
wherein the first parallel virtualization subsystem is further configured to generate the first virtual data according to one or more switching tables established according to the at least one first virtual command.

13. The apparatus as claimed in claim 12, further comprising:
a lock manager configured to provide synchronization between the first parallel virtualization subsystem and the second parallel virtualization subsystem when the first and second parallel virtualization subsystems are cooperating in performing data virtualization.

14. The apparatus as claimed in claim 12, wherein the management system is further configured to distribute data virtualization to optimize performance of the first and second parallel virtualization subsystems.

15. The apparatus as claimed in claim 12, wherein the cooperation between the first parallel virtualization subsystem and the second parallel virtualization subsystem comprises sharing command virtualization tables.

16. The apparatus as claimed in claim 12, wherein the cooperation between the first parallel virtualization subsystem and the second parallel virtualization subsystem comprises sharing data virtualization tables.

17. The apparatus as claimed in claim 12, wherein the first parallel virtualization subsystem is further configured to generate the first virtual data prior to receiving all data associated with the first data communications.

18. The apparatus as claimed in claim 12, wherein:
the first parallel virtualization subsystem comprises a plurality of virtual volume drivers; and
the first parallel virtualization subsystem is further configured to determine which of the plurality of virtual volume drivers should be used to generate the at least one first virtual command.

* * * * *